(12) United States Patent
Matsuyama

(10) Patent No.: US 9,483,070 B2
(45) Date of Patent: Nov. 1, 2016

(54) PEDAL GUIDE SYSTEM DEVICE

(76) Inventor: Teruo Matsuyama, Hyogo (JP)

(*) Notice: Subject to any disclaimer, the term of this patent is extended or adjusted under 35 U.S.C. 154(b) by 354 days.

(21) Appl. No.: 13/996,047

(22) PCT Filed: Dec. 20, 2010

(86) PCT No.: PCT/JP2010/007371
§ 371 (c)(1),
(2), (4) Date: Jun. 3, 2014

(87) PCT Pub. No.: WO2012/085959
PCT Pub. Date: Jun. 28, 2012

(65) Prior Publication Data
US 2014/0284127 A1  Sep. 25, 2014

(51) Int. Cl.
| B60K 26/02 | (2006.01) |
| G05G 1/60 | (2008.04) |
| B60T 7/06 | (2006.01) |
| B60K 28/00 | (2006.01) |

(52) U.S. Cl.
CPC ............... *G05G 1/60* (2013.01); *B60K 26/02* (2013.01); *B60K 28/00* (2013.01); *B60T 7/06* (2013.01)

(58) Field of Classification Search
CPC ........ B60K 26/02; B60K 28/00; G05G 1/60; B60T 7/06
USPC ........................................................ 180/89.1
See application file for complete search history.

(56) References Cited

U.S. PATENT DOCUMENTS

| 2,163,962 | A | * | 6/1939 | Pomernacki | ................... 74/566 |
| 2,167,959 | A | * | 8/1939 | Pomernacki | ................... 74/564 |
| 2,567,529 | A | * | 9/1951 | Schetzer | ......................... 74/564 |
| 2,651,944 | A | * | 9/1953 | Schetzer | ......................... 74/564 |
| 3,207,276 | A | * | 9/1965 | Wing et al. | ................... 477/207 |
| 2007/0137396 | A1 | * | 6/2007 | Mahendra et al. | ............. 74/512 |
| 2014/0145462 | A1 | * | 5/2014 | Choi | ........................... 296/1.07 |
| 2014/0284127 | A1 | * | 9/2014 | Matsuyama | ................. 180/89.1 |

FOREIGN PATENT DOCUMENTS

| JP | 38-10554 | 6/1963 |
| JP | 05-86658 | 11/1993 |
| JP | 07-022825 | 4/1995 |
| JP | 2010269650 A | 12/2010 |

OTHER PUBLICATIONS

Internantional Search Report for International Application No. PCT/JP2010/007371 mailed Mar. 29, 2011.

* cited by examiner

*Primary Examiner* — Karen Beck
(74) *Attorney, Agent, or Firm* — Marshall, Gerstein & Borun LLP

(57) ABSTRACT

To provide a pedal guide system device for preventing an erroneous operation of a driver for the brake pedal and the accelerator pedal of a vehicle. A pedal guide system device for preventing an erroneous operation of a driver for a brake pedal and an accelerator pedal of a vehicle is provided with a plate-shaped, bellows-shaped, belt-shaped, or curtain-shaped guide component, which can be attached to the vehicle with a predetermined gap of 0.5-10 cm beside the brake pedal and/or the accelerator pedal and has the similar height as the height from the lower surface of a dashboard to the floor. The pedal guide system device enables a pedal operation in a space enclosed by four surfaces including a floor surface, an inner panel, and the dashboard, thereby enabling simple and easy to understand pedal position confirmation, enabling beginners and elderly people to get easily accustomed thereto, and enabling prevention of the erroneous operation for the pedals.

6 Claims, 11 Drawing Sheets

PEDAL GUIDE SYSTEM DEVICE

TECHNICAL FIELD

The present invention relates to a pedal guide system device of a vehicle, which prevents pedal misapplication between the brake pedal and the accelerator pedal.

BACKGROUND ART

At present, there have been many accidents caused by pedal misapplication between the brake pedal and the accelerator pedal. The National Police Agency statistics show that the number of the accidents caused by pedal misapplication was 6,546 (including 30 fatal accidents) in 2008 and 6,582 (including 33 fatal accidents) in 2009. Such many accidents occurred in one year due to pedal misapplication, only with cases which are clear to have been handled as an accident.

The reason of the increase in accidents caused by pedal misapplication may be explained as follows: A conventional car with a manual transmission (MT car) had a structure such that drivers operate three pedals with both feet, therefore the position of the pedals was easy to perceive by the relative position of the right and left feet and the accidents due to pedal misapplication rarely occurred. Whereas, in a car with an automatic transmission (AT car), which occupies the majority of the currently used cars, the pedals are operated by the right foot alone, therefore the positional relation between the brake pedal and the accelerator pedal is difficult to perceive. In particular, when the right foot once leaves the pedal or when, driving backward for example, a driver have to look back and forth and from side to side moving in a complicated way and twisting the body to greatly break the basic position, the driver often becomes unsure of the position of the pedal to be stamped on and thereby getting disturbed and confused. In such situations, accidents due to pedal misapplication are prone to occur. Consequently, in order to prevent such accidents, it is necessary to let drivers instantly and securely recognize the position of the brake pedal and the accelerator pedal.

The Patent Literature 1, for example, discloses a device for preventing pedal misapplication between the accelerator pedal and the brake pedal of an automobile, which has a flange or a plate that is high enough to be touched with a driver's shoe and provided at the left side of the brake pedal.

The Patent Literature 2 discloses a device for preventing accelerator pedal misapplication, which has a plate-shaped or bar-shaped projection that is as high as or lower than the brake pedal and placed above the middle of the accelerator pedal of an automobile with a gap allowing a foot to insert between the projection and the accelerator pedal.

In order to prevent pedal misapplication between the brake pedal and the accelerator pedal of an automobile, these prior arts have a structure such that a driver can recognize the position of the brake pedal and the accelerator pedal by touching the pedal with the foot to confirm the presence of the preventive device.

[Patent Literature 1]: Japanese Examined Patent Application Publication No. S38-10554 (See FIG. 3, FIG. 4)

[Patent Literature 2]: Japanese Unexamined Utility Model Application Publication No. H05-86658 (See FIG. 1 to FIG. 3)

SUMMARY OF INVENTION

Technical Problem

The plate-shaped or bar-shaped preventive device of the inventions described in Patent Literature 1 and Patent Literature 2 is as high as or slightly higher than the brake pedal or the accelerator pedal, so that a driver can confirm its presence with the foot. However, thus structured, the preventive device itself may disadvantageously catch the foot of an upset driver who needs a sudden pedal operation, for example when a pedestrian unexpectedly rushes out. Further, even during ordinary driving, the projection of the preventive device in Patent Literature 1 might cause a driver to trip it over to fail in stamping down on the brake pedal to the floor if the driver stamps down on the brake pedal slightly from the left; or the cross bar of the preventive device in Patent Literature 2 might cause the driver to trip it over to fail in stamping down on the accelerator pedal if the driver stamps down on the accelerator pedal slightly from the front. The inventions described in Patent Literature 1 and Patent Literature 2 fundamentally require a driver to carefully grope for the object in a space where the foot is out of sight and touch the pedal to be stamped on once with the shoe thereby judging by the sense through the shoe. That lacks a sense of speed. Furthermore, if the driver puts on thick-soled shoes, it might be hard to feel the touch.

The present invention has been made in view of the foregoing and the object of the invention is to provide a pedal guide system device;

(1) enabling a driver to instantly recognize a pedal to be stamped on by sensing with the foot so as to guide before pedal operation, in order to prevent the driver from pedal misapplication; and (2) enabling to reduce interference such as stamping down on the device itself or tripping over the device, which might occur when stamping down on the brake pedal or the accelerator pedal, particularly in a flurry.

Solution to Problem (Claim 1)

To solve the problems aforementioned, a pedal guide system device according to the present invention is characterized in that a pedal guide system device for preventing an erroneous operation of a driver for the brake pedal and the accelerator pedal of a vehicle is provided with a plate-shaped, bellows-shaped, belt-shaped, or curtain-shaped guide component, which can be attached to the vehicle with a predetermined gap of 0.5 cm to 10 cm beside the brake pedal and/or the accelerator pedal and is ⅔ to 1 of the height from the lower surface of a dashboard to the floor.

Thus structured, the guide component enables a driver to easily confirm the position of the pedal with the foot. Further, since the guide component is ⅔ to 1 of the height from the lower surface of a dashboard to the floor, it is safe from being stamped down from above. Furthermore, the guide component is high enough for the driver to touch it also with the calf or other part except the foot. It will bring the driver a sense of safety such that just by moving the foot to the guide component roughly without groping for it, the driver can confirm the position of the pedal more quickly and easily than ever before. Here, it should be noted that the height from the lower surface of the dashboard to the floor means the maximum height from the lower surface of the dashboard to the floor (See the reference letter H in FIG. 2). Still further, the guide component, provided beside the pedal with a predetermined gap of 0.5 cm to 10 cm, does not interfere with the brake pedal and the accelerator pedal. Preferably the guide component projects from the position of a pedal pad toward the driver by about 5 cm to 30 cm, more preferably about 10 cm to 20 cm, so as to have a wider side surface, because such a guide component is more easily confirmed by the foot and enables easy recognition of the pedal position The guide component can be attached at either side or both sides of the brake pedal and the accelerator pedal. It should be noted that the guide component is placed, in the case of being attached to the brake pedal, at the left side of the brake pedal, and is placed, in the case of being attached to the accelerator pedal, at the right side of the accelerator pedal.

To provide the guide component at both of the left side of the brake pedal and the right side of the accelerator pedal enables the driver to safely stamp down on each pedal just by recognizing the left guide component with the foot before stamping down on the brake pedal and just by recognizing the right guide component with the foot before stamping down on the accelerator pedal. To provide the guide component at both sides also enables to form a space enclosed with the both guide components, the floor and the dashboard, where the driver can move the right foot. The driver can also feel safe by inserting the right foot into the space.

The guide component is preferably made of a material that is strong enough for the driver to press the right foot thereto, but inflicts no pain on the driver if the foot is pressed thereto, such as ABS resin and urethane for example.

(Claim 2)

Preferably the guide component in the pedal guide system device of Claim 2 can be folded when not in use, for example when boarding and exiting. The guide component can be (1) in the case of a plate-shaped guide component, folded up in a two or three-step drawer-style with some rails provided thereon, for example; (2) in the case of a bellows-shaped guide component, folded like an accordion curtain; and (3) in the case of a belt-shaped or curtain-shaped guide component, rolled up. According to the structure, the driver can fold the guide component when boarding and exiting so as not to be interfered with the guide component, thereby enabling easy boarding and exiting. When seated in a driver's seat, the driver can put the guide component in working order.

(Claim 3)

A pedal guide system device for preventing an erroneous operation of a driver for the brake pedal and the accelerator pedal of a vehicle of Claim 3 is characterized in that:

the pedal guide system device is provided with a guide component having plate-shaped sidewalls, which can be attached to the vehicle with a predetermined gap of 0.5 cm to 10 cm respectively at the left side of the brake pedal and the right side of the accelerator pedal and is ⅔ to 1 of the height from the lower surface of the dashboard to the floor, and a bar-like member which connects the upper part of the sidewalls, thereby forming a space covering the brake pedal and the accelerator pedal, where the driver is allowed to operate the brake pedal and the accelerator pedal with the right foot.

In this structure, the guide component having the sidewalls and the bar-like member can limit the lateral space with the sidewalls and the vertical space with the floor and the bar-like member, so as to form a space for the operation of the brake pedal and the accelerator pedal. Accordingly, when a driver is seated in the driver's seat and drives the vehicle with the right foot put into the space, in the case of stamping down on the brake pedal, it is possible for the driver to previously confirm the left sidewall with the foot before stamping on the brake pedal, and in the case of stamping down on the accelerator pedal, it is possible for the driver to previously confirm the right sidewall with the foot before stamping on the accelerator pedal. Therefore, the positional confirmation of each pedal can be instantly and easily performed. Further, since the floor rises and leads to the dashboard in the front, the rising part of the floor can block up the front. Thus the space is enclosed with the sidewalls in the lateral direction, with the bar-like member and the dashboard in the upward direction and with the floor in the downward and forward directions. Therefore, it is safe that the right foot is prevented from moving to unexpected position. Preferably the shape of the sidewall follows the form from the floor to the dashboard. It is also preferable that the sidewalls and the bar-like member are made of a material that is strong enough for a driver to press the right foot thereto, but inflicts no pain on the driver if the foot is pressed thereto, such as ABS resin and urethane for example.

Effects of the Invention

As aforementioned, the pedal guide system device according to the present invention enables a driver to confirm the position of the brake pedal and his/her right foot, thereby promptly and effectively preventing pedal misapplication between the brake pedal and the accelerator pedal and efficiently preventing damages and troubles.

EXPLANATION OF REFERENCE LETTERS

Figure 1:
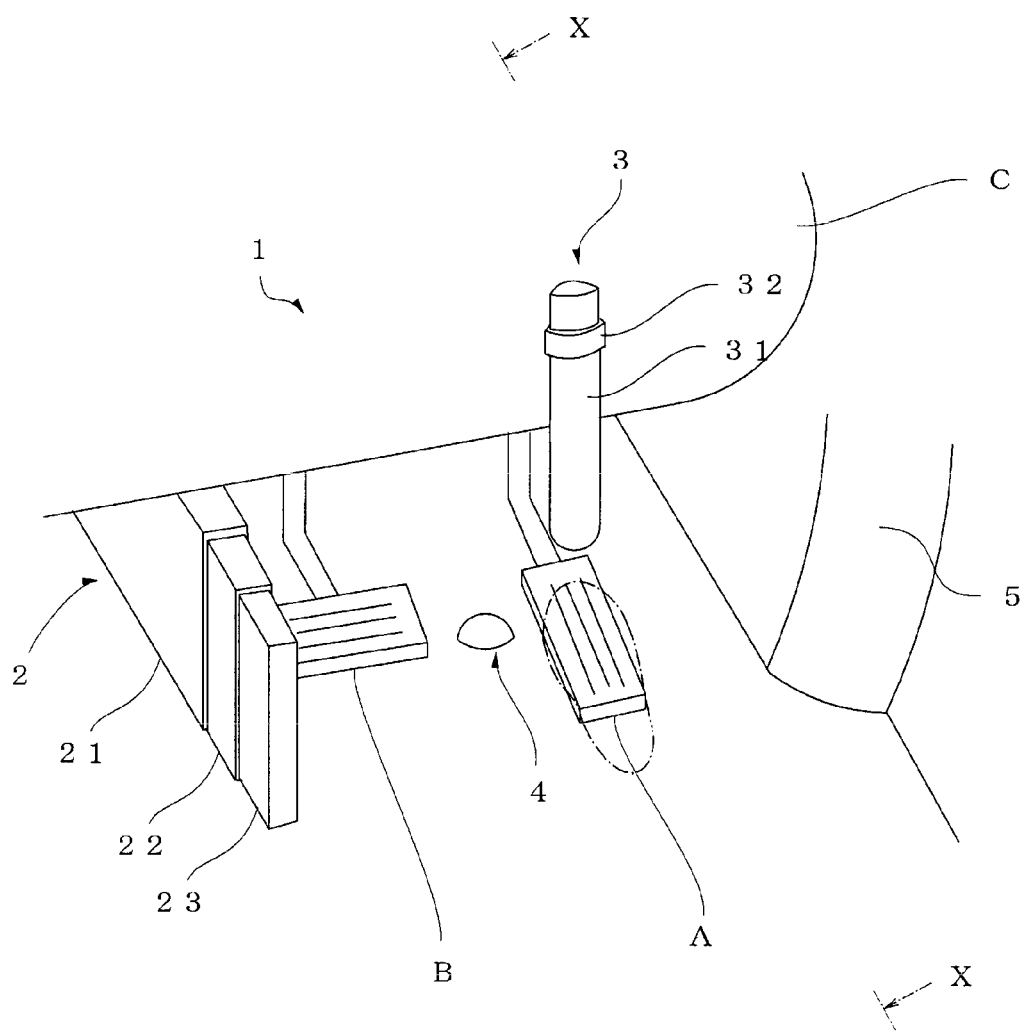
FIG. 1 is a perspective view of a pedal guide system device according to the first embodiment of the invention.

1, 1A, 1B: Pedal guide system device
2: Guide component
21: Plate-shaped member
22: Plate-shaped member
23: Plate-shaped member
24: Fitting
3: Suspended bar component
31: Bar-like member
32: Holder
33: Rail unit
34: Base
4: Foot position confirmation component
5: Projecting section of an inner panel
6: Inducible shoe sack component
61: Sack
62: Joint
63: Cord
64: Remote control button
A: Accelerator pedal
B: Brake pedal
C: Dashboard
D: Steering wheel
120, 220, 320, 420: Guide component (modified exemplar)
130, 230: Suspended bar component (modified exemplar)
140, 240: Foot position confirmation component (modified exemplar)

DESCRIPTION OF EMBODIMENTS

Hereinafter, embodiments according to the present invention will be described with referent to the drawings, but the present invention should not be limited to the embodiments.

[Structure of a Pedal Guide System Device]

1. (Overall Structure)

Figure 2:
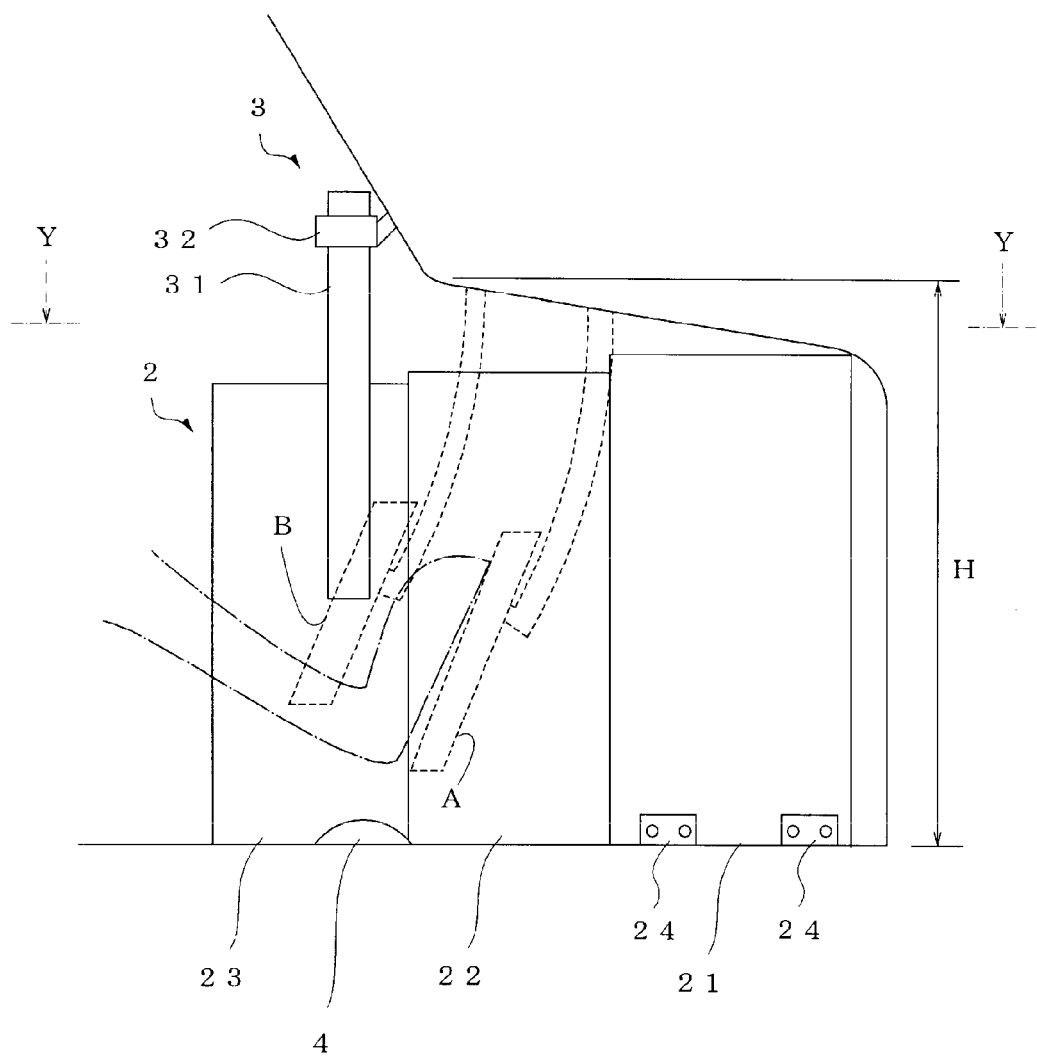
FIG. 2 is a cross-sectional side view of the pedal guide system device, taken along the line X-X of FIG. 1.
Figure 3:
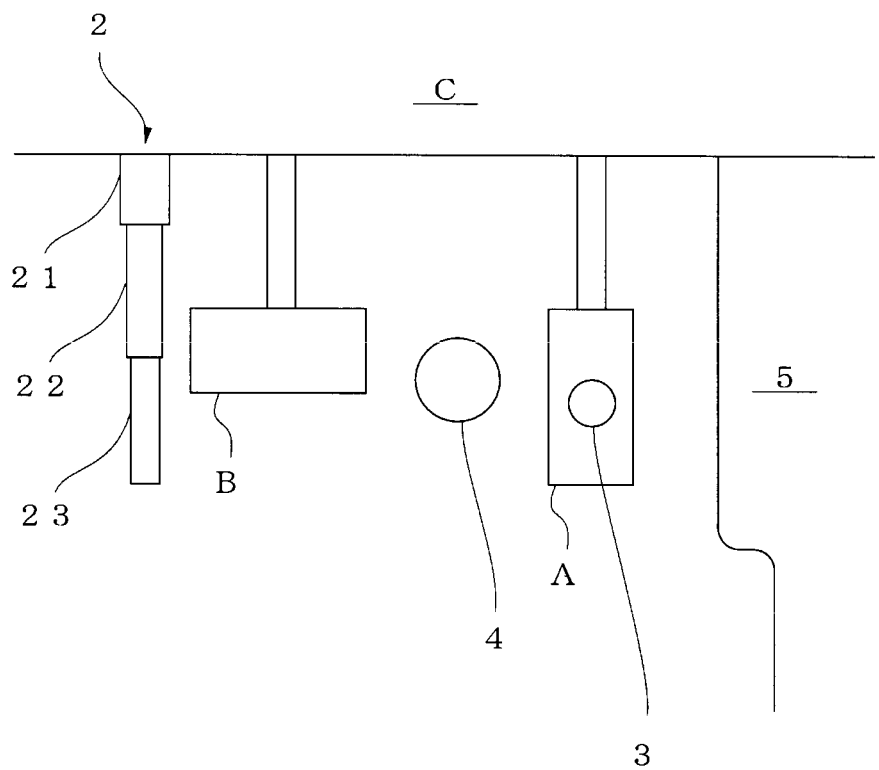
FIG. 3 is a cross-sectional plane view of the pedal guide system device, taken along the line Y-Y of FIG. 1.

As illustrated in FIGS. 1-3, a pedal guide system device 1 according to the present invention is provided with a guide component 2, a suspended bar component 3 and a foot position confirmation component 4 and is placed in a space for a driver of an automobile to operate an accelerator pedal A and a brake pedal B. The following are the detailed description of the guide component 2, the suspended bar component 3 and the foot position confirmation component 4.

2. (Guide Component)

Figure 4:
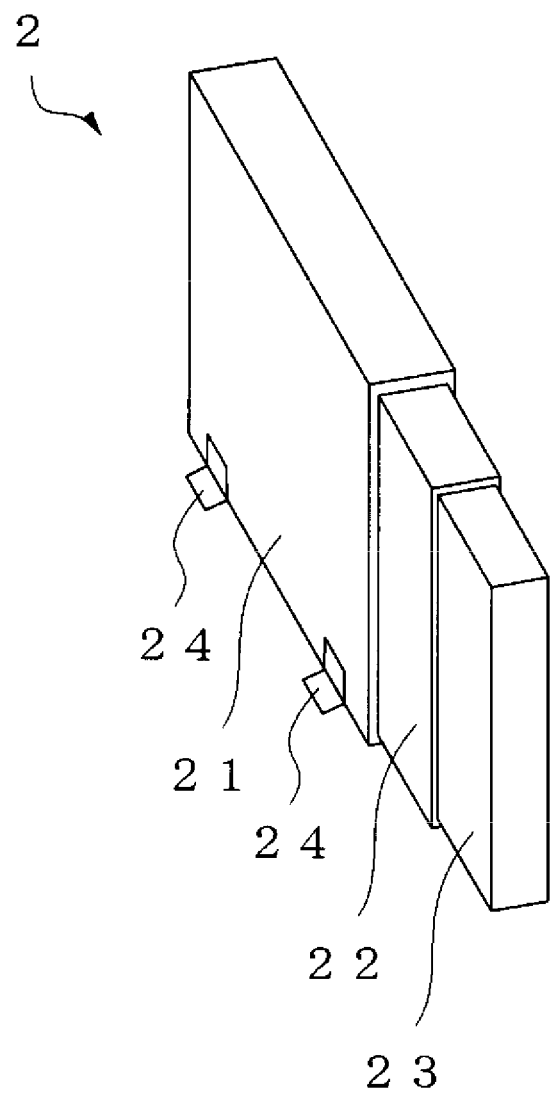
FIG. 4 is a perspective view showing a plate-shaped and drawer-style guide component of the pedal guide system device according to the first embodiment of the invention.

As illustrated in FIG. 4, the guide component 2 has plate-shaped members 21, 22 and 23 which are structured in a drawer-style. When boarding and exiting, the driver pulls the plate-shaped members 22 and 23 into the plate-shaped member 21 in this order and when in use, pulls the plate-shaped members 22 and 23 out from the plate-shaped member 21. The plate-shaped member 21 has fittings 24 provided at the upper side and lower side thereof so as to be fixed to the lower surface of the dashboard C and to the upper surface of the floor of the automobile. The guide component 2 is screwed to the lower surface of the dashboard C and the upper surface of the floor through the fittings 24.

As illustrated in FIGS. 1-3, the guide component 2 is preferably placed at the left side of the brake pedal B with a gap of about 2 cm. At this position, the guide component 2 is prevented from interfering with the brake pedal B under operation. In addition to it, the driver can find the brake pedal B just by pressing the right foot to the guide component 2 and then lowering the right foot.

The guide component 2 is placed at the left side of the brake pedal B in this embodiment, but not limited to there, it can be also placed at the right side of the accelerator pedal A or at both of the right side of the accelerator pedal A and the left side of the brake pedal B.

Figure 5:
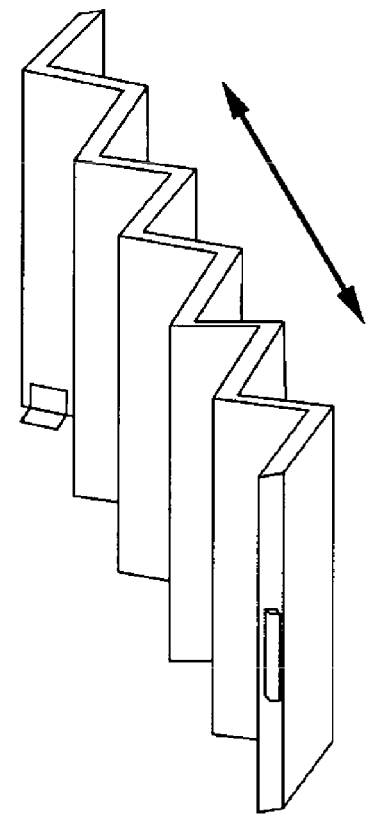
FIG. 5 is a perspective view showing a bellows-shaped guide component of the pedal guide system device according to the first embodiment of the invention.
Figure 6:
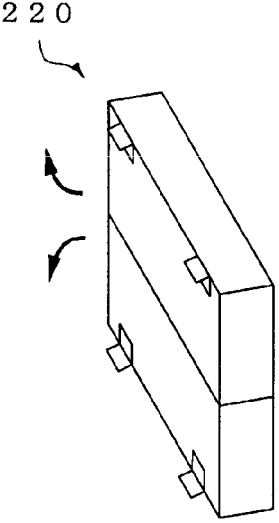
FIG. 6 is a perspective view showing a folding guide component of the pedal guide system device according to the first embodiment of the invention.
Figure 7:
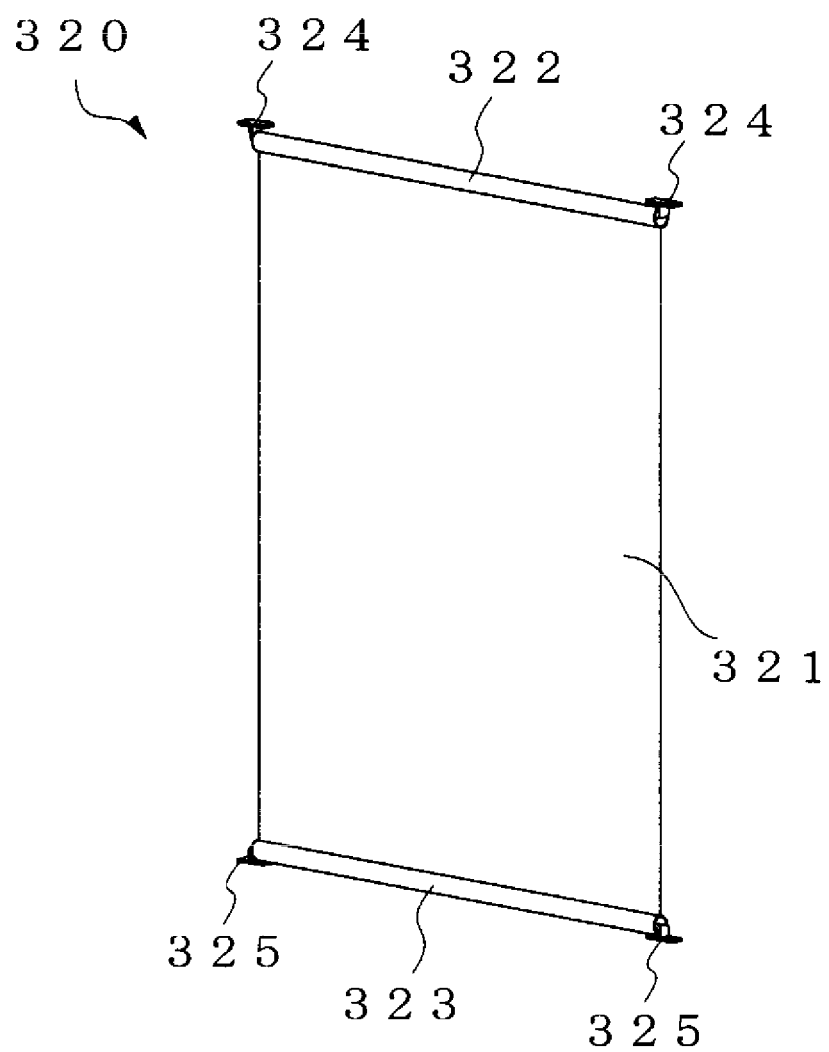
FIG. 7 is a perspective view showing a curtain-shaped guide component of the pedal guide system device according to the first embodiment of the invention.

FIGS. 5-7 show a modified exemplar of the guide component 2. FIG. 5 illustrates a guide component 120 in a bellows-style, which can be folded when not in use and can be stretched when in use.

FIG. 6 illustrates a guide component 220 which is foldable like a double door. The upper piece can be brought up and the lower piece can be brought down and locked when not in use, which can be returned and fastened to each other when in use.

FIG. 7 illustrates a curtain-style guide component 320. The guide component 320 is provided with a cloth curtain 321 which has pipe members 322 and 323 at the upper end and the lower end thereof. The guide component 320 is provided on the dashboard C by two joints 324, which are attached to the dashboard C by using double-faced adhesion tape or a screw and inserted into the hollow part of the upper end pipe member 322 from the both sides, so that the joints 324 can hold the pipe member 322 rotatable. When the guide component 320 is not in use, the curtain 321 can be rolled up and contained in the upper end pipe member 322. Meanwhile, two elastic joints 325 are fixed on the floor. When the guide component 320 is in use, the curtain 321 is dropped down and the pipe member 323 at the lower end is held by inserting the right and left joints 325 into the hollow part thereof.

The guide component can be provided with an alternative belt which has a narrower width than the curtain 321.

3. (Suspended Bar Component)

Figure 8:
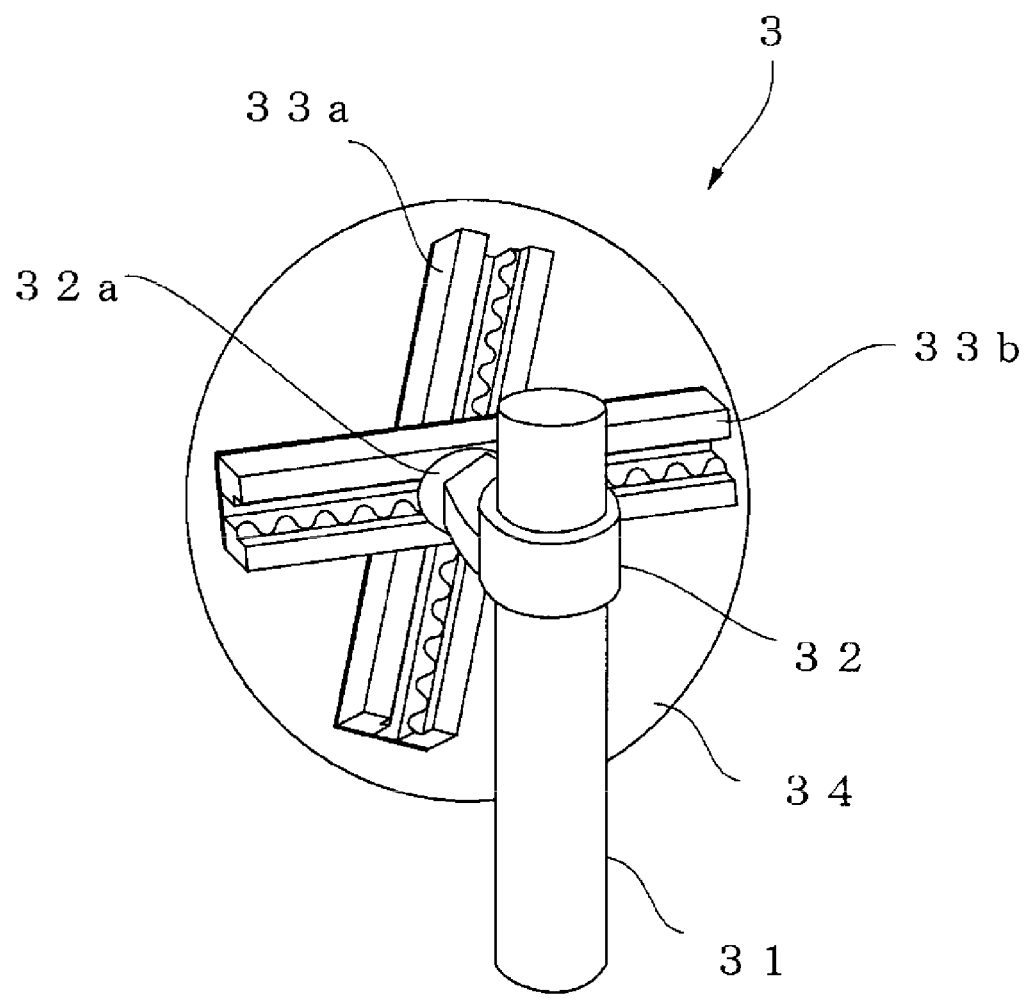
FIG. 8 is a perspective view showing a suspended bar component of the pedal guide system device according to the first embodiment of the invention, which can be adjusted up and down, right and left.

As illustrated in FIG. 8, the suspended bar component 3 has a column bar-like member 31 of about 10 cm long, which is made of foam resin, a holder 32 for holding the bar-like member 31 vertically movable, and a rail unit 33 which can move on the holder 32 back and forth and to right and left.

The bar-like member 31, as made of foam resin, inflicts no pain on the driver when he/her presses the foot thereto and returns back to the original position after the driver pressed the foot. Other elastic material such as sponge and rubber is suitable as well as foam resin.

The holder 32 is a cylindrical member, and the inside diameter decreases as a bolt is fastened like a pinch cock, and increases as the bolt is loosened. The bar-like member 31 is inserted into the inside circular part and held at any position by fastening the bolt. The holder 32 is provided with a slider 32a which is connected with the rail unit 33.

The rail unit 33 has a rail 33a extending backward and forward, in detail, backward and upward, and forward and downward in the state it is attached to the dashboard C, and a rail 33b which has another slider (not illustrated) fitted to the rail 33a at the back thereof and extends right and left. The slider 32a of the holder 32 is fitted to the rail 33b. Thus the bar-like member 31 is allowed to slide back and forth and to right and left accompanying the holder 32. The rails 33a and 33b have corrugated structure, so as to latch the slider at a predetermined interval like a cutter knife. The rail 33a is fixed to the base 34 which has strong double-faced adhesion tape (not illustrated) being attached to the back surface thereof, thereby being fixed to the dashboard C of the automobile. Except by double-faced adhesion tape, the base 34, provided with a screw hole, can also be fixed to the dashboard C by a screw.

As illustrated in FIGS. 1-3, it is preferable to fix the base 34 to the dashboard C so that the lower end of the suspended bar component 3 reaches nearly the middle point in the upper part of the triangular area with the toe, ankle and shin of the right foot at its tips (about 3 to 5 cm above the ankle of the right foot) in the state that the driver puts the right foot on the accelerator pedal A. Thus placed, the suspended bar component 3 is prevented from interfering with the right foot during ordinary driving. If necessary, the driver can recognize it by slightly lifting the right foot. Even after the base 34 is fixed, it is also possible to adjust the suspended bar component 3 up and down, back and forth, to right and left, as mentioned above.

The suspended bar component 3 is placed above the accelerator pedal A in the embodiment, but not limited to it, also can be placed above the brake pedal B or above each the accelerator pedal A and brake pedal B.

Figure 9:
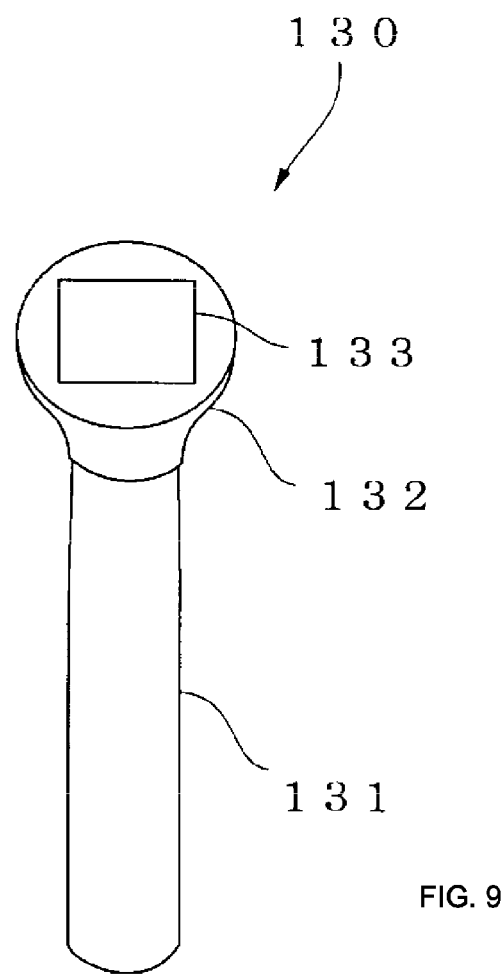
FIG. 9 is a perspective view showing a fixed suspended bar component of the pedal guide system device according to the first embodiment of the invention.
Figure 10:
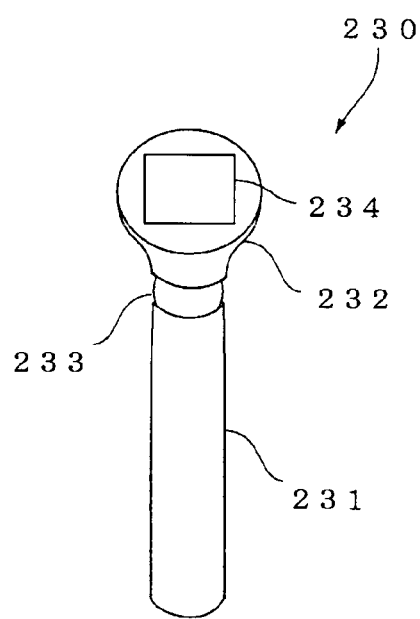
FIG. 10 is a perspective view showing a suspended bar component of the pedal guide system device according to the first embodiment of the invention, which is provided with a ball joint.

FIGS. 9 and 10 illustrate modified exemplars of the suspended bar component 3. FIG. 9 illustrates a suspended bar component 130, wherein a bar-like member 131 is fixed to a base 132. Unlike the suspended bar component 3, after the base 132 is once fixed to the dashboard C by double-faced adhesion tape 133, it is not possible to adjust the suspended bar component 130 up and down, back and forth, to right and left, but the suspended bar component 130 has a simple and economical structure to be manufactured cheaper. Even after placement, it is possible to cut the bar-like member 131 to fit the preferred length.

FIG. 10 illustrates a suspended bar component 230, wherein a base 232 and a bar-like member 231 are connected with a ball joint 233. When pressed from the side by the right foot of the driver, the bar-like member 231 can flexibly move by the ball joint 233.

4. (Foot Position Confirmation Component)

Figure 11:
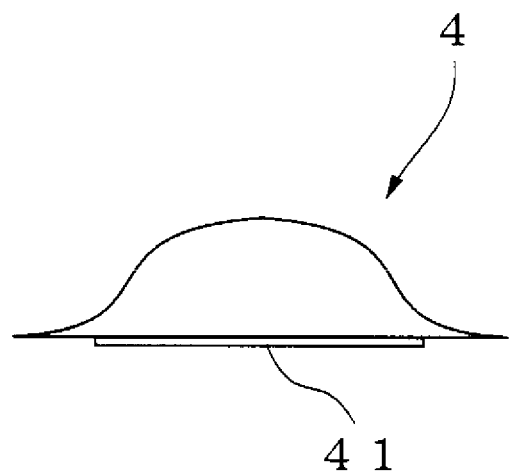
FIG. 11 is a perspective view showing a projection-type foot position confirmation component of the pedal guide system device according to the first embodiment of the invention.

As illustrated in FIG. 11, a foot position confirmation component 4 is a mound-like projection. As illustrated in FIGS. 1-3, the foot position confirmation component 4 is placed at the middle between the accelerator pedal A and the brake pedal B, and fixed under a floor mat. For fixing under the floor mat, strong double-faced adhesion tape 41 is attached at the back of the foot position confirmation component 4. It is also possible to set the foot position confirmation component 4 on the floor mat. In this case, the foot position confirmation component 4 can be attached to the floor mat by strong hook-and-loop fastener provided on the back thereof. The driver can recognize that his/her right foot is located midway between the accelerator pedal A and brake pedal B just by stamping down on the projection with the right foot for confirmation. That is, the driver can find the brake pedal B by shifting the right foot to the left from the foot position confirmation component 4 and find the accelerator pedal A by shifting the right foot to the right from the foot position confirmation component 4.

Figure 12:
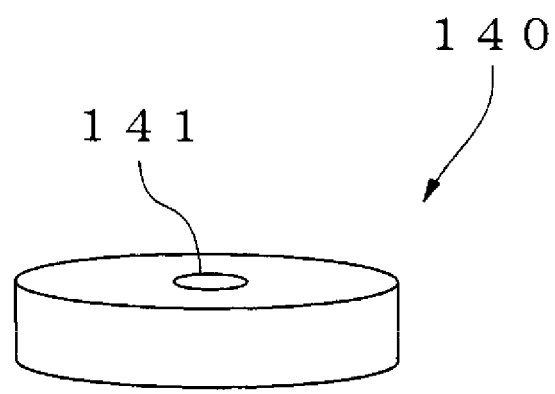
FIG. 12 is a perspective view showing a push button-type foot position confirmation component of the pedal guide system device according to the first embodiment of the invention.
Figure 13:
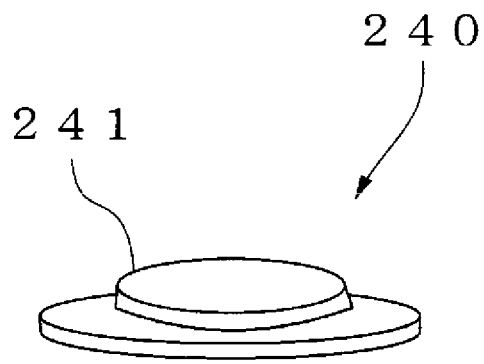
FIG. 13 is a perspective view showing a sensor-type foot position confirmation component of the pedal guide system device according to the first embodiment of the invention.

FIG. 12 and FIG. 13 illustrate modified exemplars of the foot position confirmation component 4. FIG. 12 illustrates a sensor-type foot position confirmation component 140. An infrared sensor is used as a sensor, which defects infrared rays of the right foot that moves over the detecting section 141 and sounds. That is, when the right foot passes over or stays on the foot position confirmation component 4, the sensor reacts to sound thereby enabling the driver to confirm the position of his/her right foot through hearing.

FIG. 13 illustrates a button-type foot position confirmation component 240. The driver can make a sound by stamping down on the button with the right foot, thereby confirming the position of his/her right foot through touching and hearing. It is preferable that the sound is low and modest in volume like an alarm of PCs.

5. (Inner Panel)

Generally in an automobile, there is an inner panel projecting toward the right side of the accelerator pedal A. By pressing the right foot to the projecting part 5 of the inner panel, the driver can recognize the existence of the accelerator pedal A. Accordingly, four surfaces including the projecting part 5 of the inner panel, the suspended bar component 2, the guide component 3 and the foot position confirmation component 4 can make the driver more securely recognize the position of his/her right foot, the accelerator pedal A and the brake pedal B.

Second Embodiment of the Present Invention

Figure 14:
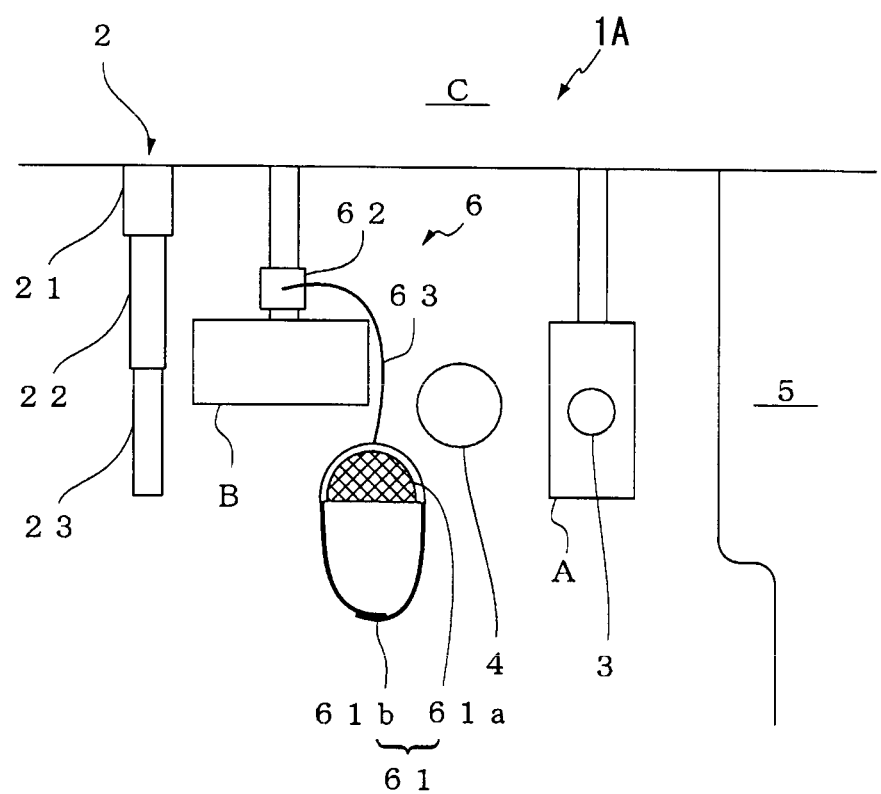
FIG. 14 is a cross-sectional plane view of the second embodiment of the invention.
Figure 15:
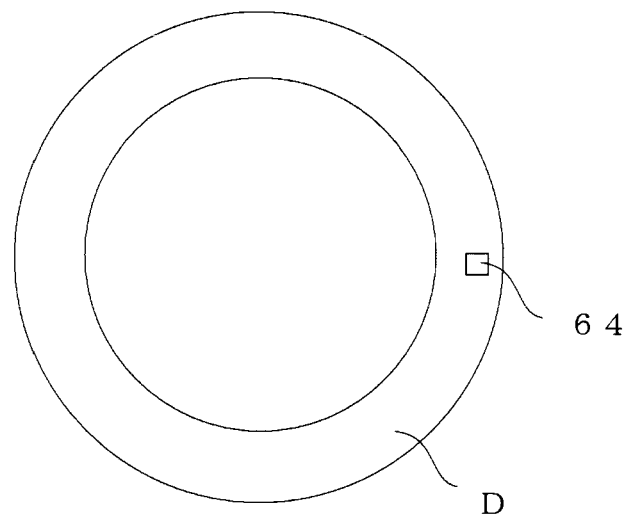
FIG. 15 is a front view of a steering wheel of the second embodiment of the invention.

The second embodiment of the present invention will be described below. As illustrated in FIG. 14 and FIG. 15, a pedal guide system device 1A is a modified exemplar of the pedal guide system device 1, which has an inducible shoe sack component 6 additionally. In FIG. 14, the same reference letters are employed for designating the same elements in the pedal guide system device 1.

The inducible shoe sack component 6 has a sack 61, a joint 62 for fixing to the shaft of the brake pedal B and a cord 63 for connecting them. The sack 61 includes a mesh bag 61a provided at the front part thereof for inserting the right foot therein and a belt member 61b having hook-and-loop fastener for fastening at the back of the right foot. The joint 62 is provided with a built-in motor which is operated by pushing a remote control button 64 to wind up the cord 63 instantly. The driver inserts the right foot in the sack 61 during ordinary driving, and in the case of being confused about the position of his/her foot, such as requiring sudden braking, just pushes the remote control button 64 provided on a steering wheel D (shown in FIG. 15), etc., to wind up the cord 63, thereby forcing the right foot to move to the position of the brake pedal.

Except the structure employing the motor and remote controller, the inducible shoe sack component 6 can have a structure such that the cord 63, like a cord of a vacuum cleaner, is winded back to the joint 62 by stretching the right foot wearing the sack 61 to pull out the cord 63 to the maximum extent. In either case, the inducible shoe sack component 6 is fixed by a screw so that the joint 62 can pinch the shaft of the brake pedal B.

Third Embodiment of the Present Invention

Figure 16:
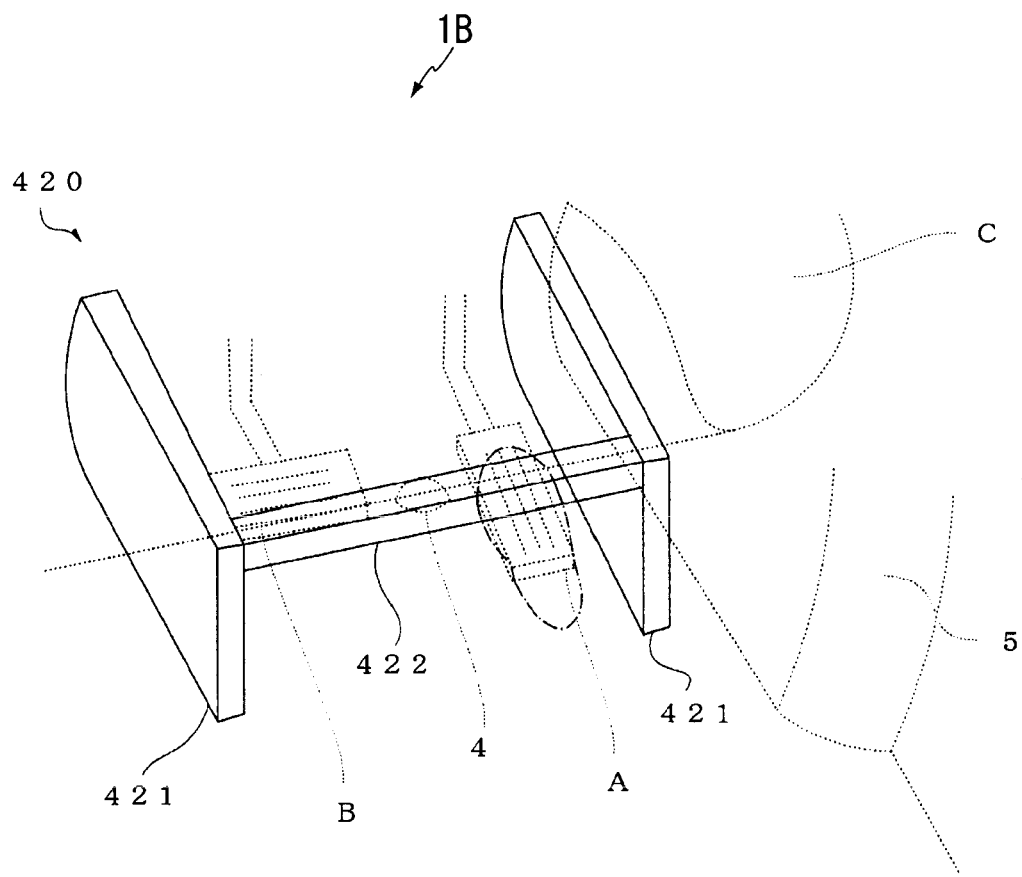
FIG. 16 is perspective view of a pedal guide system according to the third embodiment of the invention.

The third embodiment of the present invention will be described below. As illustrated in FIG. 16, a pedal guide system device 1B is a modified exemplar of the pedal guide system device 1, wherein the suspended bar component 3 is removed and the guide component 2 is changed with a guide component 420 which has sidewalls and a bar-like member and has a front view of an inverted U-shape. In FIG. 16, the same reference letters are employed for designating the same elements in the pedal guide system device 1.

As illustrated in FIG. 16, the guide component 420 includes sidewalls 421 and a bar-like member 422. The sidewalls 421 are connected with the bar-like member 422 at the upper part near the driver. The guide component 420 is placed so as to cover the accelerator pedal A and the brake pedal B. Thus structured, the guide component 420 can restrict the lateral and vertical movement of the right foot. Specifically, a space, where the sides are enclosed with the sidewalls 421, the top is enclosed with the bar-like member 422 and the dashboard, and the front and bottom are enclosed with the floor, is formed. The driver puts the right foot in the space to operate the accelerator pedal A and the brake pedal B. The driver, when stamping down on the brake pedal B, just presses the right foot to the left sidewall 421 before stamping on the brake pedal B, and when stamping down on the accelerator pedal, just presses the right foot to the right sidewall 421 before stamping on the accelerator pedal A. Therefore the driver can easily perceive each position of the accelerator pedal A and the brake pedal B. Moreover, it is enough for the driver to roughly press the right foot to either sidewalls without groping the guide component. That enables the driver to instantly recognize the position of each pedal to be operated.

The preferred embodiments of the present invention are described with referent to the drawings as aforementioned, but various additions, changes and deletion will be made without departing form the scope of the invention. For example, a pedal guide system device including the guide component 2 alone or a pedal guide system device including the guide component 2 and the suspended bar component 3 can also guide the right foot of a driver. Accordingly these are included in the scope of the invention. Further, the pedal guide system device can be provided on an existing vehicle or previously incorporated in a vehicle in a manufacturing process.

[Additional Statement 1]

The pedal guide system device according to claim 1 or 2, wherein the pedal guide system device is provided with a suspended bar component made of elastic material, which can be attached to the dashboard of the vehicle, extends down to any part from the driver's toe to the shin from the dashboard and has a length not to touch the driver's foot with the lower end thereof, in a state when the driver puts the right foot on the brake pedal or the accelerator pedal.

According to this structure, the driver can confirm that his/her foot is on the brake pedal or the accelerator pedal by slightly lifting the foot off the brake pedal or the accelerator pedal to touch the suspended bar component. It is safe that even when the foot is not on either of the brake pedal and the accelerator pedal, the driver, by touching the suspended bar component with the foot from the side, can recognize the existence of the brake pedal or the accelerator pedal under the suspended bar component. The suspended bar component is made of elastic material such as foam resin and sponge, which is safer and less scratchy than those of high rigidity and returns to its original state after touched with the foot from the side, so as to keep on guiding the pedal position.

[Additional Statement 2]

The pedal guide system device according to Additional statement 1, wherein the suspended bar component is adjustable up and down, back and forth or to right and left, or any combination thereof.

According to this structure, the driver can adjust the suspended bar component to the preferred position. The adjustment to the driver's preferred position in the vertical direction can be done in accordance with how high the driver lifts the foot before touching the suspended bar component, and that in the longitudinal direction or lateral direction can be done in accordance with the part (the toe, ankle, shin or other part) of the leg with which the driver touches the suspended bar component.

[Additional Statement 3]

The pedal guide system device according to any of Claims 1-3, Additional statement 1 or 2, wherein the pedal guide system device is provided with a foot position confirmation component, which enables a driver to confirm the position of his/her right foot and is placed between the brake pedal and the accelerator pedal.

According to this structure, the driver can confirm that his/her foot is positioned between the brake pedal and the accelerator pedal, and find the brake pedal by moving the foot to the left and the accelerator pedal by moving the foot to the right.

[Additional Statement 4]

The pedal guide system device according to Additional statement 3, wherein the foot position confirmation component comprises one selected from a light sensor, a buzzer button and a projection.

According to this structure, the foot position confirmation component is the mound-like projection placed on the floor between the brake pedal and the accelerator pedal, the buzzer button placed at the same position or the sensor at the same position, which reacts when the foot passes over it. The projection enables the driver to confirm the foot position by a sense in the foot, the buzzer button enables the driver to confirm the foot position by a sense in the foot and a sound made by pushing it, and the sensor enables to signal the passing of the foot by a light or sound so that the driver can visually or aurally confirm the foot position.

[Additional Statement 5]

The pedal guide system device according to any of Claims 1-3, and Additional statements 1-4, wherein a inducible shoe sack component is provided on a shaft of the brake pedal including a pad and shaft, which has a main body, a sack and a cord for connecting them, the sack allows the driver to insert the right foot wearing a shoe, and the cord can be winded back to the main body by the driver's operation, thereby bringing the right foot back to the position of the brake pedal.

According to this structure, in the case of being confused about the position of his/her foot, such as requiring sudden braking, the driver can operate to force the right foot to the position of the brake pedal. Here the driver's operation may be to push a preset button, or to wind back the cord, like a cord of a vacuum cleaner, by stretching the right foot to pull out the cord at a maximum extent, for example. The sack preferably has a mesh part at the front section thereof and the shoe inserted in the mesh part is preferably held by fastening hook-and-loop fastener at the back thereof. The actuating button may be mounted on a steering wheel or other position easier for the driver to push.

[Additional Statement 6]

A vehicle characterized by being provided with the pedal guide system device according to any of Claims 1-3, and Additional statements 1-5.

The pedal guide system device may be previously incorporated in the vehicle in the manufacturing process.

INDUSTRIAL APPLICABILITY

The present invention is applicable in industrial fields of manufacturing a pedal guide system device of a vehicle for preventing pedal misapplication between the brake pedal and the accelerator pedal.

What is claimed is:

1. A pedal guide system device for preventing erroneous operation by a driver of a brake pedal and an accelerator pedal of a vehicle, wherein the brake pedal and the accelerator pedal each comprises an inner edge and an outer edge, and the inner edges of the brake pedal and the accelerator pedal are in facing relationship, the device comprising:
a first plate-shaped guide component adapted to be attached to the vehicle adjacent to the brake pedal laterally spaced from the outer edge of the brake pedal by 0.5 cm to 10 cm,
a second plate-shaped guide component adapted to be attached to the vehicle adjacent to the accelerator pedal and laterally spaced from the outer edge of the accelerator pedal by 0.5 cm to 10 cm, wherein the first plate-shaped guide component and the second plate-shaped guide component each has a height extending from a floor of the vehicle to a dashboard of the vehicle that is ⅔ to 1 of the height from the lower surface of a dashboard to the floor.

2. The pedal guide system of claim 1, wherein the vehicle has an automatic transmission.

3. A pedal guide system device for preventing erroneous operation by a driver of an automatic transmission vehicle that includes only two pedals, the two pedals being a brake pedal and an accelerator pedal, the device comprising:
a first plate-shaped guide component adapted to be attached to the vehicle adjacent to the brake pedal laterally spaced from an outer edge of the brake pedal by 0.5 cm to 10 cm,
a second plate-shaped guide component adapted to be attached to the vehicle adjacent to the accelerator pedal and laterally spaced from an outer edge of the accelerator pedal by 0.5 cm to 10 cm, wherein the first plate-shaped guide component and the second plate-shaped guide component each has a height extending from a floor of the vehicle to a dashboard of the vehicle that is ⅔ to 1 of the height from the lower surface of a dashboard to the floor.

4. The pedal guide system device of claim 3, wherein the first plate-shaped guide component is laterally spaced from a left outer edge of the brake pedal and the second plate-shaped guide component is laterally spaced from a right outer edge of the accelerator pedal.

5. A pedal guide system device for preventing erroneous operation by a driver of a brake pedal and an accelerator pedal of a vehicle, the device comprising:
a first plate-shaped guide component adapted to be attached to the vehicle adjacent to the brake pedal laterally spaced from the brake pedal by 0.5 cm to 10 cm,
a second plate-shaped guide component adapted to be attached to the vehicle adjacent to the accelerator pedal and laterally spaced from the accelerator pedal by 0.5 cm to 10 cm, wherein the first plate-shaped guide component and the second plate-shaped guide component each has a height extending from a floor of the vehicle to a dashboard of the vehicle that is ⅔ to 1 of the height from the lower surface of a dashboard to the floor, and wherein the first plate-shaped guide component and the second plate-shaped guide component are adapted to be attached to the vehicle such that a space defined between the first plate-shaped guide component and the second plate-shaped guide component and the brake pedal and the accelerator pedal or both disposed within the space.

6. The pedal guide system of claim 5, wherein the vehicle is an automatic transmission vehicle.

* * * * *